United States Patent
Perentes et al.

(10) Patent No.: US 10,144,579 B2
(45) Date of Patent: Dec. 4, 2018

(54) CAPSULE WITH REINFORCEMENT MEMBERS USED FOR THE PREPARATION OF A BEVERAGE

(71) Applicant: NESTEC S.A., Vevey (CH)

(72) Inventors: Alexandre Perentes, Lausanne (CH); Daniel Abegglen, Rances (CH); Arnaud Gerbaulet, Oye et Pallet (FR); Jean-Francois Tinembart, Yverdon (CH); Bruno Bizet, Montbellet (FR); Nicolas Jean-Guy Bezet, Macon (FR)

(73) Assignee: Nestec S.A., Vevey (CH)

( * ) Notice: Subject to any disclaimer, the term of this patent is extended or adjusted under 35 U.S.C. 154(b) by 545 days.

(21) Appl. No.: 14/353,863

(22) PCT Filed: Oct. 23, 2012

(86) PCT No.: PCT/EP2012/070905
§ 371 (c)(1),
(2) Date: Apr. 24, 2014

(87) PCT Pub. No.: WO2013/060655
PCT Pub. Date: May 2, 2013

(65) Prior Publication Data
US 2014/0318379 A1    Oct. 30, 2014

(30) Foreign Application Priority Data
Oct. 24, 2011    (EP) .................................... 11186326

(51) Int. Cl.
*A47J 31/06*    (2006.01)
*B65B 29/02*    (2006.01)
(Continued)

(52) U.S. Cl.
CPC ........ *B65D 85/8043* (2013.01); *A47J 31/407* (2013.01); *B65D 65/466* (2013.01)

(58) Field of Classification Search
CPC ...... A47J 31/407; A47J 31/22; A47J 31/0673; A47J 31/3695; B65D 85/8043
(Continued)

(56) References Cited

U.S. PATENT DOCUMENTS

| 2,589,783 | A | * | 3/1952 | Crossley | ............... | A47J 31/057 |
| | | | | | | 99/295 |
| 7,823,723 | B2 | * | 11/2010 | Anthony | ............... | B65D 5/748 |
| | | | | | | 206/219 |

(Continued)

FOREIGN PATENT DOCUMENTS

| WO | 2008148650 | 12/2008 |
| WO | 2010026045 | 3/2010 |

(Continued)

*Primary Examiner* — Dana Ross
*Assistant Examiner* — Ket D Dang
(74) *Attorney, Agent, or Firm* — K&L Gates LLP (57) ABSTRACT

Capsule (1) for containing beverage ingredients for producing a beverage in a beverage preparation device upon liquid injection into the capsule and by rotating the capsule about its central axis in the device, the capsule comprising:—a side wall (2a), a bottom wall (2b), an opening (2c) and a flange-like rim (2d), and—a lid member (3) attached to the flange-like rim (2d) and/or to the side wall and at least partially covering the opening, wherein the lid member (3) comprises an upper wall (3a) in recess relative to the flange-like rim and/or to the side wall towards the opening of the capsule and which comprises a central inlet (4) and peripheral outlet apertures (5) for the beverage release by effect of centrifugal forces, wherein the lid member (3) further comprises reinforcement members (6) protruding from the upper wall (3a) in axial direction.

18 Claims, 3 Drawing Sheets

(51) Int. Cl.
*B65D 85/804* (2006.01)
*A47J 31/40* (2006.01)
*B65D 65/46* (2006.01)

(58) Field of Classification Search
USPC ............ 426/77–80, 431–433, 112, 115, 590;
422/270; 99/279, 286, 289 R, 287,
99/302 R, 302 C, 295, 318, 323, 302,
99/307, 316, 289
See application file for complete search history.

(56) References Cited

U.S. PATENT DOCUMENTS

| 2005/0150390 | A1* | 7/2005 | Schifferle | B65D 85/8043 99/295 |
| 2007/0148290 | A1 | 6/2007 | Ternite et al. | |
| 2008/0210099 | A1* | 9/2008 | Magg | A47J 31/4467 99/304 |
| 2008/0216666 | A1* | 9/2008 | Doglioni Majer | B65D 85/8043 99/295 |
| 2008/0264267 | A1* | 10/2008 | Doglioni Majer | B65D 85/8043 99/295 |
| 2010/0239734 | A1* | 9/2010 | Yoakim | A47J 31/22 426/433 |

FOREIGN PATENT DOCUMENTS

| WO | 2010026053 | 3/2010 |
| WO | 2010066705 | 6/2010 |
| WO | 2011092301 | 8/2011 |

* cited by examiner

CAPSULE WITH REINFORCEMENT MEMBERS USED FOR THE PREPARATION OF A BEVERAGE

CROSS REFERENCE TO RELATED APPLICATIONS

The present application is a National Stage of International Application No. PCT/EP2012/070905, filed on Oct. 23, 2012, which claims priority to European Patent Application No. 11186326.2, filed Oct. 24, 2011, the entire contents of which are being incorporated herein by reference.

FIELD OF THE INVENTION

The present invention relates to the field of beverage preparation using capsules by way of centrifugation. More particularly, the invention relates to a capsule containing beverage ingredients and comprising reinforcement means for supporting an upper wall of the capsule during engagement with a dedicated rotary engagement member of a beverage preparation device.

BACKGROUND OF THE INVENTION

Capsules containing beverage ingredients and designed for producing a beverage in a beverage preparation device upon liquid injection into the capsules and by rotating the capsules around their central axis in the device are known.

The principle consists in preparing a beverage by passing a liquid through beverage ingredients contained in the capsule using centrifugal forces. Thereby, liquid is usually injected in a central inlet area of the capsule before and/or during rotation of the capsule in order to make the liquid interact with the ingredients in the capsule, thereby forming a beverage such as coffee, ground coffee, tea and the like. The resulting beverage is then allowed to exit the capsule by means of at least one outlet aperture provided at a portion arranged peripherally and radially outwards with respect to the central inlet area of the capsule.

A capsule for preparing a beverage or liquid food and a system using centrifugal forces is for example described in WO2008/148650. The capsule is formed of a body containing a substance such as coffee powder which is closed by a lid member and a membrane. The membrane is perforated by an injection member of a beverage preparation device in the central part of the membrane for injection of liquid. The capsule further comprises outlet openings arranged at a substantially peripheral portion of the lid member of the capsule for enabling the prepared beverage to leave the capsule under the centrifugal forces exerted in the capsule during beverage preparation.

The capsule according to the prior art suffers the drawback that during injection of liquid into the capsule by means of a dedicated injection member of the beverage preparation device, the upper wall or lid member of the capsule may be deformed or even broken due to a lack of support in the centrifugal brewing chamber of the device.

A lack of support may come from a possible or needed distance between the lid and a rotary engagement member of the device. For instance, a distance or gap between the capsule (i.e., the lid of the capsule) and the rotary engagement member may be needed to allow a sufficient room for the beverage to flow towards the collecting means of the beverage preparation device.

However, the pressure of liquid in the capsule increase gradually from the centre to the periphery of the lid due to the generated centrifugal forces and the pressure of liquid may reach high values at the periphery during the beverage extraction operation. If the lid is not supported enough or well due to the distance, it may be damaged (e.g., torn or ruptured) or may be forced to disconnect from the rest of the capsule.

Therefore, a capsule is sought-after which enables the reliable preparation of a beverage by means of centrifugation within a dedicated beverage preparation device.

The present invention seeks to address the above described problems. The invention also aims at other objects and particularly the solution of other problems as will appear in the rest of the present description.

OBJECT AND SUMMARY OF THE INVENTION

In a first aspect, the present invention relates to a capsule containing beverage ingredients for producing a beverage in a beverage preparation device upon liquid injection into the capsule and by rotating the capsule around its central axis in the device, the capsule comprising a side wall, a bottom wall, an opening and a flange-like rim, and a lid member attached to the flange-like rim and/or to the side wall and at least partially covering the opening, wherein the lid member comprises an upper wall in recess relative to the flange-like rim and/or side wall towards the opening of the capsule and which comprises a central inlet for supplied liquid and peripheral outlet apertures for the beverage release by effect of centrifugation forces, wherein the lid member further comprises reinforcement members positioned between the central inlet and the peripheral apertures and/or between peripheral apertures which are radially and/or circumferentially distant one another; the reinforcement members protruding from the upper wall in axial direction.

The reinforcement members are thereby arranged for at least axially supporting the upper wall on a rotary engagement member of the beverage preparation device when the beverage is extracted from the capsule during rotation of the capsule.

Preferably, a plurality of reinforcement members is provided and the reinforcement members are spaced apart circumferentially and/or radially on the upper wall.

According to the invention, the reinforcement members which protrude from the upper wall of the capsule enable a rigid support of the lid member during beverage injection into the capsule. Hence, a significant deflection of the lid member, due to the centrifugal forces of the centrifuged liquid, can be prevented or at least reduced significantly. The reinforcement members are essentially arranged to bear the pressure which tends to deflect and/or separate the lid from the rest of the capsule; such pressure being therefore transmitted to the rotary engaging member of the device.

The reinforcement members are designed to transfer an axial force respectively an axial component of a force which is applied onto the capsule during the rotation of the capsule within the beverage preparation device, onto a rotary engagement member of the beverage preparation device provided at a lid side of the capsule.

Thereby, the axial force results from the rotational movement of the capsule body by means of a rotary holder of the device, thereby generating centrifugal forces exerted on the content of the capsule and urging the content towards the outlet apertures of the lid member.

Accordingly, the centrifugal forces of the ingredients respectively the liquid within the capsule are applied onto the capsule and are then effectively transferred to the rotary engagement member by means of the reinforcement members of the lid member.

Moreover, if necessary, the reinforcement members may also be designed to provide a support in a radial and/or circumferential direction, i.e. in direction of rotation about the symmetric axis or centre axis of the capsule. Hence, during beverage preparation, no relative motion in axial direction and no relative rotational and/or radial displacement is present between the capsule and the rotary engagement member during rotation of the capsule by means of device.

According to an embodiment of the invention, the reinforcement members protrude in a direction perpendicular to the upper wall. Thereby, the reinforcement members preferably protrude in a direction parallel to the symmetric central axis of the capsule.

The reinforcement members may as well be arranged essentially tapered and/or inclined with respect to the symmetric axis of the capsule. Thereby, the reinforcement members and/or at least one edge of the reinforcement members may be arranged at an angle of between 5 and 45 degrees, more preferably at an angle of between 15 and 35 degrees with respect to a symmetric central axis of the capsule when seen in sectional side view.

The reinforcement members according to the present invention are preferably arranged within an annular portion of the upper wall in recess, which is situated between the central inlet of the lid member and the flange-like rim of the capsule.

Thereby, the reinforcement members are preferably distributed circumferentially and evenly about the central inlet of the lid member in order to provide an increased rigidity along the whole surface of the lid member against deformation in the axial direction during the beverage-preparation process.

The reinforcement means are designed to further provide a physical barrier against liquid flow from the central inlet to a peripheral portion of the upper wall of the lid member. Thereby, the reinforcement means may be designed to force liquid escaping the central inlet to meander about the reinforcement members from the central inlet to a peripheral portion of the lid member.

In a preferred embodiment, the reinforcement members are integrally formed with the lid member. However, the reinforcement members may also be provided as an additional, separate element or elements which may be provided to the lid member. Thereby, the reinforcement members may be an insert such as an annular ring of smaller diameter than the recess respectively the opening of the capsule, the insert being designed for connecting it to the lid member by connection means such as for example glue.

The reinforcement members preferably extend from the upper wall of the lid member into the recess thereof to a maximal height that is lower than or equal to the depth of the recess.

The reinforcement members preferably comprise at least a first array of reinforcement members and a second array of reinforcement members that is arranged radially outside of the first array. Thereby, the second array of the reinforcement members preferably protrudes to a height that is greater than the height of the first array. Accordingly, the reinforcement means are preferably designed to interact with a rotary engagement member having a lower surface respectively contact surface of essentially convex or pyramidal shape.

In a preferred embodiment, the reinforcement members comprise a plurality of profiles of different sizes and/or different geometrical shapes.

The profiles preferably comprise at least one angular or bent portion when seen from top view onto the upper wall of the capsule. Thereby, the angular or bent portion is preferably designed to confer a rigid support of the lid member during rotary engagement of the capsule.

The angular or bent portion of the reinforcement members is also designed to prevent the profiles from twisting under the forces of centrifugation. Accordingly, an undesired deformation or even breakage of the lid is prevented.

The profiles of the reinforcement members are preferably essentially non linear such as T, L, Y, V or U, W, Z-shaped when seen from a top view onto the upper wall of the capsule.

The profiles may be arranged within different annular portions of the lid member, i.e. portions which are arranged at different radii about the central liquid inlet when seen from a top view. Thereby, the geometrical shape and/or the height of the profiles arranged at said different annular portions preferably differs. Moreover, the profiles of said different annular portions may be arranged radially offset with respect to each other.

Between the individual profiles, interstitial spaces are preferably provided. Thereby the interstitial spaces may be geometrically designed to receive a correspondingly shaped profile of the rotary engagement member.

Moreover, certain interstitial spaces between the profiles may be designed to form flow paths for liquid from the outer peripheral outlet apertures to the circumference of the lid member at the upper surface of the lid member.

According to the invention, the functions of beverage flow control through the capsule and the rigidity of the capsule can be separated. In particular, the peripheral outlet apertures may be distributed independently of the provided reinforcement members.

The capsule and/or the lid member is preferably made of a material or materials chosen amongst plastic(s), biodegradable plastic(s), bio-based polymer(s), cellulose-based material(s) such as paper and combinations thereof.

In a second aspect, the present invention relates to a beverage preparation system comprising a capsule according to the invention and a beverage preparation device comprising a liquid injection means for supplying liquid to the capsule and a rotary engagement member designed for interacting with the reinforcement members of the capsule during beverage preparation.

Thereby, the rotary engagement member is preferably designed for engaging with the reinforcement members of the capsule. Thus, a rigid support for the lid member against deformation or breakage is provided during the beverage preparation process.

In a further aspect, the present invention relates to a kit comprising
  a rotational-symmetric capsule body for being filled, by a consumer, with beverage ingredients, the capsule body comprising a side wall, a bottom wall, an opening and a flange-like rim, and
  a lid member which is designed to be mechanically associated to the capsule body by the consumer, preferably without using tools, in order to at least partially close off the opening of the body and to essentially avoid the leakage of beverage ingredients filled into the capsule body, wherein the lid member comprises an upper wall in recess relative to the flange-like rim and/or sidewall towards the opening of the capsule and which comprises a central inlet and peripheral outlet apertures, wherein the lid member further comprises reinforcement members positioned between the central inlet and the peripheral apertures and/or between peripheral apertures which are radially and/or circumferentially distant one another; the reinforcement members protruding from the upper wall in axial direction.

In a preferred embodiment, the reinforcement members are integrally formed with the lid member or provided as a separate element designed for being connected to an outer surface of the lid member.

The term "without using tools" means that the user may associate the capsule body and the lid member of the kit essentially without the necessary help of any additional means which are to be provided to the kit such as a mechanical press or a specific association tool.

According to the invention, a user is enabled to provide a specific amount of beverage ingredients to the capsule body and then provide a lid member to the body in order to enclose the beverage ingredients within the compartment formed by the body and the lid member. Thereby, lid members comprising reinforcement members of different shapes and/or design may be provided in the kit according to the invention. Hence, the support respectively the reinforcement members of the lid member may be adapted to specific beverage preparation devices the capsule is intended to be used with.

In addition, upper walls or lid members having peripheral outlet apertures of different amount and/or geometry may be provided with the kit according to the invention. Accordingly, a user may be enabled to adjust the extraction properties of the capsule in relation to at least the different filling levels and/or granulate characteristics of a beverage ingredient to be provided to the capsule.

BRIEF DESCRIPTION OF THE FIGURES

FIG. 1b relates to a top view onto the lid member of the capsule according to the embodiment shown in FIG. 1a.

DETAILED DESCRIPTION OF EMBODIMENT

Figure 1A:
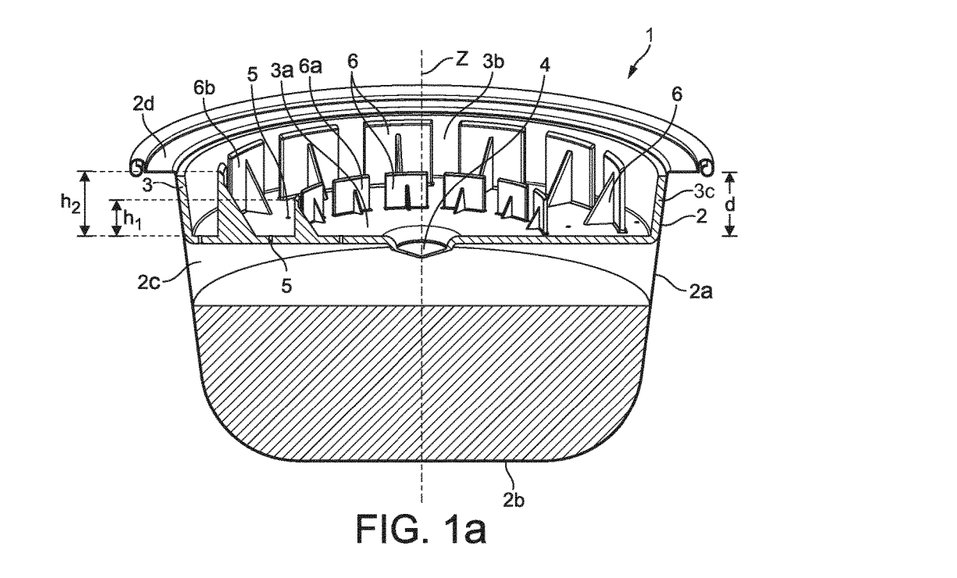
FIG. 1a relates to a perspective sectional side view of a preferred embodiment of the capsule according to the present invention.

FIG. 1a shows a perspective sectional side view of a preferred embodiment of the capsule according to the present invention.

The capsule 1 comprises a body 2 having an outer side wall 2a, a bottom portion 2b and a flange-like rim 2d. The body 2 comprises an aperture respectively mouth opening 2c into which a lid member respectively an upper wall 3 is placed to close off the interior of the capsule, thereby forming a compartment in which beverage ingredients, such as ground coffee or the like, are preferably arranged.

The lid member 3 is preferably connected to the inner surface of the side wall 2a. In an alternative embodiment (not shown), the lid member 3 may comprise an annular portion to enable the alternative or additional connection of the lid member 3 onto the upper surface of the flange-like rim 2d. The connection between the lid member 3 and the side wall 2a and/or the flange-like rim 2d may be established by means thermal or ultrasonic welding or any other suitable connection means.

Onto the upper surface of the flange-like rim 2d a membrane (not shown) for hermetically sealing the capsule may be optionally provided. Thereby, the optional membrane is preferably a sealing foil covering the lid member 3. The foil may be formed of gastight material. The membrane may be removably sealed onto the body 2 and/or lid member 3 and is thus made peelable. In such case, the membrane may be removed before inserting the capsule into the beverage preparation device.

In another preferred embodiment, the optionally provided sealing membrane may be sealed to the lid member 3 and arranged to cover at least the liquid inlet 4 and/or the outlet apertures 5 provided thereon. Hence, the inlet 4 and/or the outlet apertures 5 can be closed by the membrane before the capsule is used in the beverage preparation device. Alternatively, the capsule may be packaged or wrapped into a gas-barrier package individually or in a group of capsules.

As a result, substantially no ingredient particles (including small ones such as coffee fines) can escape from the capsule before opening of the membrane. Furthermore, if the capsule is formed of gastight material, gas transfer is substantially prevented between the external environment and the compartment before opening of the membrane. The beverage ingredients (e.g., ground coffee) are thus less subject to oxidation.

The lid member 3 comprises an upper wall 3a which forms a recess relative to the sidewall 2 and flange-like rim 2d within the opening 2c of the capsule body 2. Thereby, the upper wall 3a is preferably essentially disc-shaped and arranged essentially perpendicular to the rotational axis Z of the capsule 1.

The lid member 3 optionally further comprises an annular upright portion 3c that is provided at the circumference of the essentially disc-shaped upper wall 3a. The upright portion 3c is preferably integrally formed with the upper wall 3a and shaped to match an inner surface of the side wall 2a of the capsule 1. Accordingly, the insertion and the connection of the lid member 3 to the side wall 2a is facilitated.

The upper wall 3a is preferably arranged at a depth d with respect to the flange-like rim 2d. The depth d is preferably between 3 and 10 mm, more preferably between 4 and 8 mm, even more preferably between 5 and 6 mm.

The upper wall 3a of the lid member 3 comprises a central inlet 4 that is designed for being engaged by an injection member 21 (see FIGS. 2a and 2b) of a dedicated beverage preparation device, which is to be used in conjunction with the capsule 1 according to the present invention.

The inlet 4 is preferably closed. For example, the inlet 4 can be integrally formed (with the same material) with the upper wall 3a. Alternatively, it can be formed by a closure membrane connected to the upper wall 3a and closing an aperture of the inlet or it can also be over-moulded on the upper wall 3a in a different, e.g., softer, material. Moreover, the inlet 4 may as well be held open and thus be an aperture into which a dedicated injection member 21 of the beverage preparation device may be inserted.

The upper wall 3a of the lid member 3 further comprises peripheral outlet apertures 5 that are arranged between the central inlet 4 and the flange-like rim 2d of the capsule. The outlet apertures 5 enable the beverage, e.g., coffee extract, to leave the compartment under the effect of the centrifugal forces.

The outlet apertures 5 preferably comprise a series of holes and/or slots provided in the peripheral area of the upper wall 3a of the lid member 3. The outlet apertures 5 may as well be outlet channels that are arranged substantially in parallel to a central axis respectively rotational axis Z of the capsule 1. Thereby, the outlet channels may also be provided between the upper wall 3a and the sidewall 2a of the capsule.

The outlet apertures 5 may be designed to allow the release of liquid at a suitable or controlled flow rate while preventing solid particles escaping from the interior of the capsule to the exterior thereof.

The outlet apertures 5 preferably have a diameter or width that is smaller, most preferably at least 1.5 or even at least twice smaller, than the average particle size of the ingredients (known as mean volume diameter $D_{4,3}$ when measured by laser diffraction method using Malvern 2000 equipment in butanol solvent). Hence, the outlet apertures 5 comprise a filtering function.

Therefore, the size and number of the apertures 5 can be designed in the upper wall 3a to control the extraction pressure gradient in the capsule 1 itself. This enables to maintain a certain pressure gradient in the enclosure of the capsule 1 and thus improves the interaction between the beverage ingredients and liquid provided to the interior of the capsule 1.

Therefore, the outlet apertures 5, and in particular the number and the opening surface area of the provided outlet apertures 5, may also be designed to minimize the pressure loss created by the upper wall 3a itself during the beverage preparation.

The diameter or transversal dimension (width) of the outlet apertures 5 preferably lies between 1 and 800 microns, more preferably between 10 and 600 microns.

In order to prevent a deformation or even a breakage of the lid member 3 due to the pressure created by the centrifuged liquid and ingredients (e.g., coffee bed) acting on the upper wall 3a, the lid member 3 further comprises reinforcement members 6 which protrude from its upper wall 3a. Thereby, the reinforcement members 6 preferably extend in a direction parallel or with at least one extension edge inclined of less than 10 degrees to the symmetric axis Z of the capsule 1.

The reinforcement members 6 preferably protrude from the upper wall 3 to a maximal height h2, h1 that is equal to or smaller than the depth d of the recess 3b of the lid member 3. The reinforcement means 6 preferably protrude to different heights h2, h1 from the upper wall 3a of the lid member 3.

Thereby, the different heights hi, h2 are measured from the outer surface of the upper wall 3a in axial direction parallel to the central axis Z of the capsule 1. The depth d is measured from the outer surface of the upper wall 3a to the upper surface of the flange-like rim portion 2d in a direction parallel to the axis Z of the capsule 1.

Figure 1B:
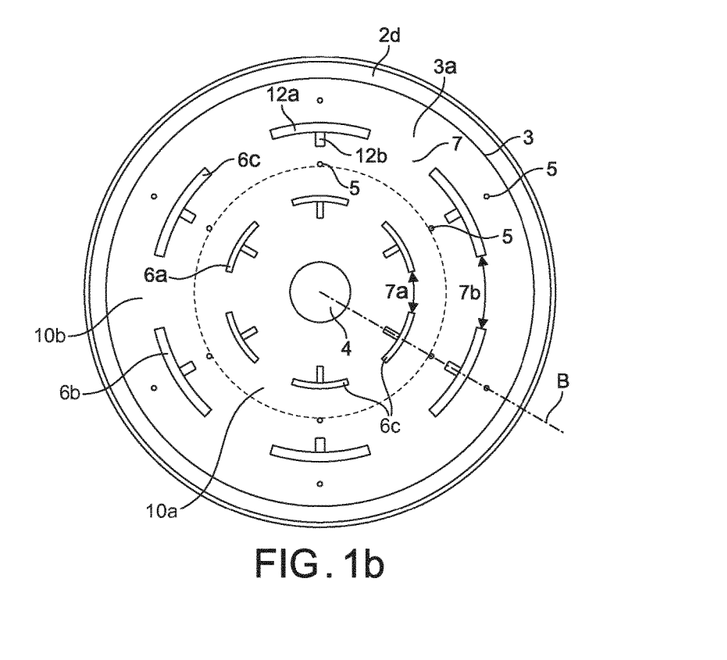

As can be seen in FIG. 1b, the reinforcement members 6 preferably form a first array 6a that is arranged circumferentially to the inlet 4 within an inner annular portion 10a of the upper wall 3a, and a second annular array 6b that is provided circumferentially to the inlet 4 and to the first array 6a within an outer annular portion 10b of the upper wall 3a.

Thereby, the first arrays 6a of the reinforcement means is of different height h1 than the second array 6b of the reinforcement members, which protrude to a height h2. The height h1 of the first array 6a is preferably less than the height h2 of the second portion 6b. Moreover, the height h2 of the second array 6b is preferably equal to or less than the depth d of the recess 3b.

The reinforcement means 6a provided within the inner portion 10a of the upper wall 3a may vary in height and/or shape from the reinforcement members 6b provided within the outer portion 10b of the upper wall 3a in order to contact or come sufficiently close to a correspondingly shaped rotary engagement member 22 of the beverage preparation device.

The height h1 of the reinforcement members 6a provided in the inner portion 10a of the upper wall 3a is preferably between 1 and 5 mm, more preferably between 2 and 4 mm.

The height h2 of the reinforcement members 6b provided in the outer portion 10b of the upper wall 3a is preferably between 5 and 10 mm, more preferably between 6 and 9 mm.

As can be seen in FIG. 1b, the reinforcement members 6a, 6b provided in the inner and outer portion 10a, 10b of the upper wall 3a are preferably evenly distributed about the circumference of the liquid inlet 4. Accordingly, the distance respectively gap 7 between the individual respective reinforcement members 6a, 6b of each array is preferably substantially equal. The arrays 6a, 6b are preferably equally distanced, i.e., concentrically arranged one another.

The reinforcement members 6 are preferably constituted by individually protruding profiles 6c. Thereby, each profile 6c preferably comprises a circular-arch-shaped portion 12a and a linear portion 12b arranged perpendicular to the circular-arch-shaped portion 12a, when seen in top view onto the lid member 3. Hence, the profiles 6c comprise a preferably essentially T-shaped structure when seen in top view which confers an improved axial rigidity.

According to such an embodiment, a rigid support means respectively reinforcement structure is provided which prevents the reinforcement members 6 from being twisted when the capsule is rotated with respect to the rotary engagement member 22 of a dedicated beverage preparation device.

It is to be understood that the reinforcement members 6 may as well comprise more than the indicated first and second arrays 6a, 6b provided in the respective annular portions 10a, 10b of the upper wall 3a.

The outlet apertures 5 are preferably arranged on a plurality of radial axis B extending from the inlet 4 to the circumference of the lid member 3. Thereby, the individual profiles 6c of the reinforcement members 6 may also be arranged on the same radial axis B as shown in FIG. 1b.

In a further preferred embodiment, the reinforcement members 6 which are arranged in the inner portion 10a of the upper wall 3a may as well comprise or be constituted by at least one protruding ring, preferably, several concentric protruding rings that are distributed around the central inlet 4 at different radii. Thereby, the concentric rings may protrude to different height h1, h2. Moreover, the reinforcement members 6 according to such an embodiment, may further comprise linear portions 12b which are connected to the rings.

Figure 2A:
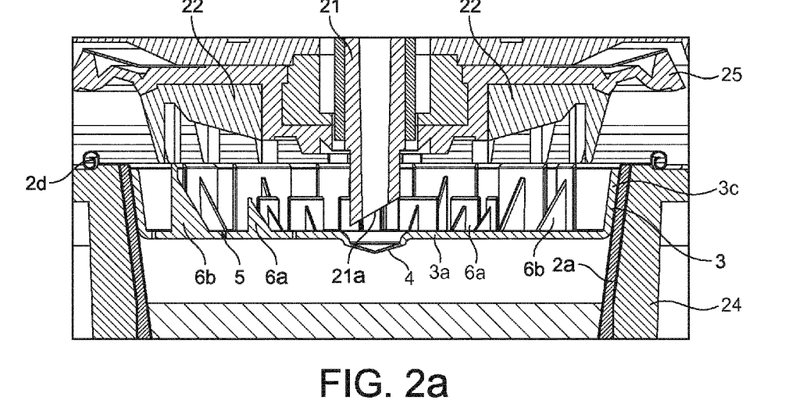
FIG. 2a relates to a preferred embodiment of the capsule according to the present invention, wherein the capsule is placed in a dedicated beverage preparation device.

FIG. 2a shows a sectional side view of a preferred embodiment of the capsule according to the present invention, wherein the capsule 1 is placed within a dedicated rotary holder 24 of a beverage preparation device. Thereby, the rotary holder 24 is preferably designed in order to accommodate the capsule 1 therein. In particular, an inner recess or wall of the rotary holder 24 is preferably shaped in order to match at least with an upper annular portion of the body 2 of the capsule 1.

The rotary holder 24 is preferably connected to drive means (not shown) such as for example an electric motor of the beverage preparation device in order to drive the capsule 1 in rotation within the holder.

The beverage preparation device further comprises a rotatable rotary engagement member 22 and a liquid injection means 21 that are arranged at a liquid inlet side of the capsule 1, opposite to the rotary holder 24.

As can be seen in FIG. 2a, the lower surface 22a of the annular rotary engagement member 22 is preferably of essentially convex shape or pyramidal shape. Thereby, the lower surface 22a of the rotary engagement member 22 may comprise at least one annular recess 23b and/or a least one annular protrusions 23a which may be designed to engage with the reinforcement means 6 provided at the lid member 3 of the capsule 1 and/or with interstitial spaces formed between the reinforcement means 6 of the capsule 1.

When the liquid injection means 21 together with the rotary engagement member 22 is lowered from a capsule insertion position, in which the capsule 1 may be provided into the rotary holder 24, into the recess 3b of the capsule 1, the liquid injection means 21 open respectively pierce the liquid inlet 4 at the center of the lid member 3. Therefore, a preferably slanted opening or blade member 21a is present at a distal portion of the injection means 21.

Figure 2B:
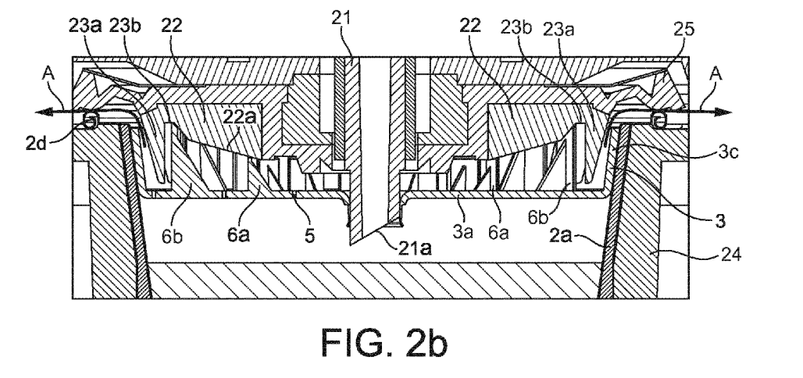
FIG. 2b relates to the embodiment shown in FIG. 2a, wherein the rotary engagement member of the beverage preparation device contacts the reinforcement members of the capsule.

When the injection means 21 and the annular rotary engagement member 22 are fully lowered and in their enclosing position as shown in FIG. 2b, the individual profiles 6c of the reinforcement means 6 are contacted by the lower surface 22a of the rotary engagement member 22.

During beverage preparation, liquid is injected into the interior of the capsule 1 by means of the liquid injection means 21 which are configured to provide heated, pressurized liquid such as water to the interior of the capsule 1.

The rotary holder 24 is designed to provide a rotational movement to the capsule 1 during beverage preparation such that liquid injected into inlet 4 is made to traverse the interior of the capsule 1 and interact with the ingredients provided therein. Then, due to the centrifugal forces applied, the resulting beverage is made to leave the capsule 1 by means of the outlet apertures 5 provided in the lid member 3. Thereby, a pressure drop across the lid member 3 and in particular across the upper wall 3a is present. A significant deflection of the lid member 3 due to the pressure drop is however effectively prevented by means of the provided reinforcement members 6. Thereby, depending on the relative distance allowed by design between the reinforcement members 6 and the lower surface 22a of the rotary engagement member 22, the lid member 3 is blocked even before rotation or after a controlled deflection during rotation. In particular an axial deflection of the lid member 3 in direction of the rotational axis Z is prevented or at least limited in acceptable limits.

Accordingly, the contact of the reinforcement members 6 with the dedicated rotary engagement member 22 provides the transfer of a rotational force applied onto the capsule 1 to the rotary engagement member 22. Hence, during the beverage preparation, a relative rotational movement between the capsule 1 and the rotary engagement member 22 and thus, deformation and/or breakage of the lid member 3 are effectively prevented.

The beverage which is ejected through the outlet apertures 5 is then forced to leave the lid member 3 to its circumference as indicated by arrows A in FIG. 2b. Thereby, valve means 25 may be present at an outer edge of the rotary engagement member 22 which are pressed against the flange-like rim portion 2d of the capsule 1.

For enabling a centrifugal ejection of beverage from the lid member 3, the reinforcement members 6 arranged between the outlet apertures 5 comprise interstitial spaces 7 through which the beverage may flow respectively meander at the upper surface of the upper wall 3a of the lid member 3. Thereby, the beverage preferably follows an essentially radial flow path.

Figure 3:
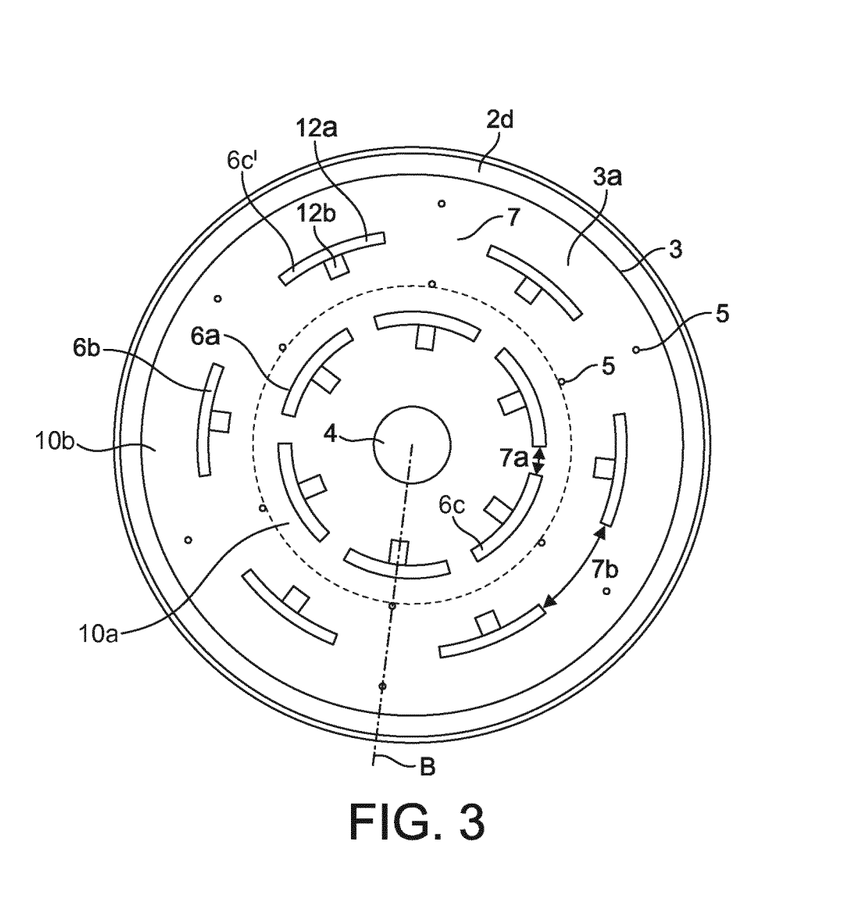
FIG. 3 relates to a top view onto a lid member according to another preferred embodiment of the capsule according to the present invention.

FIG. 3 relates to a top view of the lid member 3 according to another preferred embodiment of the present invention, wherein the profiles 6c of the reinforcement members 6a arranged in an inner annular portion 10a are preferably arranged radially offset to profiles 6c' of the reinforcement means 6b arranged in an outer annular portion 10b of the upper wall 3a. Hence, liquid that may leak from the central inlet 4 is forced to meander through the interstitial spaces 7a, 7b provided between neighboring reinforcement means 6c, 6c'.

The outlet apertures 5 are preferably arranged on a plurality of radial axes B extending from the inlet 4 to the circumference of the lid member 3. The profiles 6c' present in the outer portion 6b are arranged radially offset from the indicated axis B.

It is to be noted that instead of the indicated two arrays 6a, 6b of reinforcement members, at least a third annular array of reinforcement members may be provided which is arranged circumferentially to the second array 6b.

The interstitial spaces 7a provided between the reinforcement members 6c arranged in the inner annular portion 10a are preferably smaller in width than the interstitial spaces 7b between the reinforcement members 6c' provided within the outer annular portion 10b.

In a particular preferred embodiment, the respective interstitial space 7a, 7b between neighboring profiles 6c, 6c' of the reinforcement members 6 increases from the liquid inlet 4 to a peripheral portion of the upper wall 3a. Thereby, the reinforcement members 6a provided in the innermost portion 10a may as well be void of any interstitial space 7a, thus providing at least one closed annular ring about the circumference of the liquid inlet 4.

Although the present invention has been described with reference to preferred embodiments thereof, many modifications and alternations may be made by a person having ordinary skill in the art without departing from the scope of this invention which is defined by the appended claims.

The invention claimed is:

1. A capsule for containing beverage ingredients for producing a beverage in a beverage preparation device upon liquid injection into the capsule and by rotating the capsule about a central axis of the capsule in the device, the capsule comprising:
    a side wall;
    a bottom wall;
    an opening;
    a flange-like rim; and
    a lid member attached to the flange-like rim and/or to the side wall and at least partially covering the opening, the lid member comprises (i) an upper wall recessed relative to the flange-like rim to form a recess, (ii) a central inlet aperture and (iii) a peripheral outlet aperture for release of the beverage due to centrifugal forces, and (iv) reinforcement members positioned between the central inlet aperture and the peripheral outlet aperture, the reinforcement members protruding from the upper wall in an axial direction and providing a physical barrier against liquid flow from the central inlet aperture to a peripheral portion of the upper wall; and
    wherein the reinforcement members have at least one configuration selected from the group consisting of: (A) the reinforcement members extend from the upper wall to a maximal height which is lower than a depth of the recess; and (B) the reinforcement members comprise at least a first array of members and a second array of members which are arranged radially outside of the first array of members and which protrudes to a height greater than a height of the first array.

2. The capsule according to claim 1, wherein the reinforcement members are designed to transfer rotary forces applied onto the capsule to a rotary engagement member of the beverage preparation device.

3. The capsule according to claim 1, wherein the reinforcement members protrude in a direction perpendicular to the upper wall.

4. The capsule according to claim 1, wherein the reinforcement members are arranged at an annular portion of the upper wall between the central inlet aperture and the flange-like rim of the capsule.

5. The capsule according to claim 1, wherein the reinforcement members are designed to provide the physical barrier against liquid flow from the central inlet aperture to the peripheral portion of the upper wall.

6. The capsule according to claim 1, wherein the reinforcement members are integrally formed with the lid member.

7. The capsule according to claim 1, wherein the reinforcement members extend from the upper wall to the maximal height which is lower than the depth of the recess.

8. The capsule according to claim 1, wherein the reinforcement members comprise at least (1) the first array of members and (2) the second array of members which are arranged radially outside of the first array of members and which protrudes to the height greater than the height of the first array.

9. The capsule according to claim 1, wherein the reinforcement members comprise at least one concentrically arranged annular ring arranged about the central inlet aperture.

10. The capsule according to claim 1, wherein the reinforcement members comprise a plurality of profiles of different sizes and/or geometrical shapes.

11. The capsule according to claim 10, wherein the profiles comprise at least one angular or bent portion when viewed from a top view onto the upper wall of the capsule.

12. The capsule according to claim 10, wherein the profiles are essentially non-rectilinear when viewed from a top view onto the upper wall of the capsule.

13. The capsule according to claim 1, wherein at least one of the capsule and the lid member is made of a material selected from the group consisting of plastic, biodegradable plastic, bio-based polymer, cellulose-based material and combinations thereof.

14. The capsule according to claim 1, wherein the reinforcement members are positioned between peripheral apertures which are radially distant from one another.

15. The capsule according to claim 1, wherein the reinforcement members are positioned between peripheral apertures which are circumferentially distant from one another.

16. The capsule according to claim 1, wherein one or more of the reinforcement members have a profile comprising a circular-arch-shaped portion and a linear portion perpendicular to the circular-arch-shaped portion.

17. A beverage preparation system comprising:
a capsule for containing beverage ingredients for producing a beverage in a beverage preparation device upon liquid injection into the capsule and by rotating the capsule about a central axis of the capsule in the device, the capsule comprising a side wall, a bottom wall, an opening, a flange-like rim, and a lid member attached to the flange-like rim and/or to the side wall and at least partially covering the opening, the lid member comprises (i) an upper wall recessed relative to the flange-like rim, (ii) a central inlet aperture and (iii) a peripheral outlet aperture for release of the beverage due to centrifugal forces, and (iv) reinforcement members positioned between the central inlet aperture and the peripheral outlet aperture, the reinforcement members protruding from the upper wall in an axial direction and providing a physical barrier against liquid flow from the central inlet aperture to a peripheral portion of the upper wall; and
wherein the reinforcement members have at least one configuration selected from the group consisting of: (A) the reinforcement members extend from the upper wall to a maximal height which is lower than a depth of the recess; and (B) the reinforcement members comprise at least a first array of members and a second array of members which are arranged radially outside of the first array of members and which protrudes to a height greater than a height of the first array; and
the beverage preparation device comprising a liquid injector for supplying liquid to the capsule and a rotary engagement member designed for interacting with the reinforcement members of the capsule.

18. A kit comprising:
a rotational-symmetric capsule body for being filled, by a consumer, with beverage ingredients, the rotational-symmetric capsule body comprising a side wall, a bottom wall, an opening and a flange-like rim;
a lid member designed to be mechanically associated to the rotational-symmetric capsule body by the consumer to close off the opening of the rotational-symmetric capsule body and avoid a leakage of any beverage ingredients filled into the rotational-symmetric capsule bodythe lid member comprises (i) an upper wall recessed relative to the flange-like rim, (ii) a central inlet aperture and a peripheral outlet aperture, (iii) reinforcement members positioned between the central inlet aperture and the peripheral outlet aperture, the reinforcement members protruding from the upper wall in an axial direction and providing a physical barrier against liquid flow from the central inlet aperture to a peripheral portion of the upper wall; and wherein the reinforcement members have at least one configuration selected from the group consisting of: (A) the reinforcement members extend from the upper wall to a maximal height which is lower than a depth of the recess; and (B) the reinforcement members comprise at least a first array of members and a second array of members which are arranged radially outside of the first array of members and which protrudes to a height greater than a height of the first array.

* * * * *